United States Patent [19]

Hirai et al.

[11] Patent Number: 4,587,114
[45] Date of Patent: May 6, 1986

[54] METHOD FOR SEPARATING CARBON DIOXIDE FROM MIXED GAS

[75] Inventors: Hidefumi Hirai, 14-10, 1-Chome, Yutenji, Meguro-Ku, Tokyo, Japan; Makoto Komiyama; Keiichiro Wada, both of Tokyo, Japan

[73] Assignee: Hidefumi Hirai, Tokyo, Japan

[21] Appl. No.: 475,258

[22] Filed: Mar. 14, 1983

[30] Foreign Application Priority Data

Mar. 13, 1982 [JP] Japan ................................. 57-40014
Oct. 9, 1982 [JP] Japan ................................. 57-177859
Dec. 7, 1982 [JP] Japan ................................. 57-214329
Jan. 27, 1983 [JP] Japan ................................. 58-11739

[51] Int. Cl.$^4$ ................................................ B01J 21/18
[52] U.S. Cl. ................................. 423/247; 502/184; 502/418
[58] Field of Search ............... 502/180, 181, 184, 417, 502/418; 55/68; 423/246, 247

[56] References Cited

U.S. PATENT DOCUMENTS

| | | | |
|---|---|---|---|
| 2,528,517 | 11/1950 | Hormats | 502/417 |
| 2,920,051 | 1/1960 | Wiig | 502/417 |
| 4,019,880 | 4/1977 | Rabo et al. | 55/68 |
| 4,158,643 | 6/1979 | Sinha | 252/447 |
| 4,242,226 | 12/1980 | Siren | 502/427 |

FOREIGN PATENT DOCUMENTS 3013256 10/1981 Fed. Rep. of Germany ...... 502/417

Primary Examiner—Christopher W. Brody
Attorney, Agent, or Firm—Koda and Androlia

[57] ABSTRACT

A solid form adsorbent of carbon monoxide, that is obtained by the process including the following steps. First, copper salts or copper oxide is stirred in a solvent. Then, into the solution or suspension thus obtained, active carbon is added. Finally, the solvent is removed by means of pressure reduction, distillation, etc. The carbon monoxide adsorbent produced according to this invention adsorbs carbon monoxide rapidly when it is brought into contact with a mixed gas. The adsorbed carbon monoxide can be readily separated and discharged through either heating the carbon monoxide adsorbent to above 60° C. or reducing the partial pressure of carbon monoxide. The carbon monoxide obtained in accordance with the present invention is stable relative to the water content in the mixed gas, and it is capable of separating carbon monoxide directly from the mixed gas containing the water. Also, the separated carbon monoxide does not contain the vapor of the solvent from the carbon monoxide adsorbent. Therefore, it is not necessary to provide equipment to collect the solvent vapor. Furthermore, this carbon monoxide adsorbent does not produce corrosive gases, etc. The carbon monoxide adsorbent obtained by using copper (II) salts or copper (II) oxide is also stable relative to sulfur content in the mixed gas.

6 Claims, No Drawings

_METHOD FOR SEPARATING CARBON DIOXIDE FROM MIXED GAS_

BACKGROUND OF THE INVENTION

1. Field of the Invention

The present invention relates to a solid agent for separating carbon monoxide from a mixed gas containing carbon monoxide together with nitrogen, methane, carbon dioxide, hydrogen, etc. and also to a method for producing the agent.

2. Prior Art

Carbon monoxide is a basic raw material in synthetic chemistry and it is produced from coke and coal in water gas furnace, Winkler furnace, Lurgi furnace, Kopper's furnace, etc. It is also produced from natural gas and petroleum hydrocarbons using a steam reformation process and a partial oxidation process. In the foregoing process, the products are obtained in the form of a mixed gas containing carbon monoxide, hydrogen, carbon dioxide, methane, nitrogen, etc. The mixed gas thus obtained also contains a small amount of water. For example, the mixed gas has a composition of 35 to 40 percent carbon monoxide, 45 to 51 percent hydrogen, 4 to 5 percent carbon dioxide, 0.5 to 1.0 percent methane, 4 to 9 percent nitrogen and 1,000 to 20,000 ppm water. Likewise, carbon monoxide which is formed as a byproduct in iron mills, oil refineries or petrochemical plants is also in the form of a mixed gas.

For the use of such carbon monoxide as a raw material in synthetic chemistry, it is necessary to separate the carbon monoxide from the mixed gas.

Hydrogen is also an important raw material in the chemical industry and it is separated from various types of mixed gas or from waste gases of petrochemical plants, such as the waste gases from the process for dehydrogenation of the hydrocarbons. These waste gases frequently contain a small amount of carbon monoxide. Since the carbon monoxide is a poison to catalysts for reactions wherein hydrogen is used, it must be separated and removed. Also, these waste gases usually contain a small amount of water.

One method to separate and remove carbon monoxide from mixed gases is by means of a liquid which is a copper solution. This process involves the following steps. First, by applying a pressure of 150 to 200 atm to the mixed gas at room temperature, the carbon monoxide is separated and removed by letting it be adsorbed into the ammoniacal aqueous solution of cuprous formate or into a hydrochloric acid suspension of cuprous chloride. Then, by heating the copper solution under reduced pressure, the carbon monoxide is discharged and separated and the copper solution is regenerated. However, this cleaning process has certain shortcomings including a difficulty in controlling the operation for the prevention of the formation of precipitates, corrosion of the equipment, loss of solution and high construction costs due to the use of a high pressure.

On the other hand, a toluene solution of aluminium copper chloride ($AlCuCl_4$) has an advantage that it is not affected by hydrogen, carbon dioxide, methane and nitrogen which are contained in the mixed gas and therefore, requires a low pressure to adsorb the carbon monoxide. Nevertheless, it is defective in that it reacts irreversibly with water thereby causing deterioration in the adsorbing power of the solution as well as creating precipitates with hydrochloric acid. Consequently, it is necessary to provide a strong dehydration process prior to the adsorption process in order to reduce the water content in the mixed gas to less than 1 ppm. Strict control of the amount of water is indispensable to this procedure. Furthermore, the use of this adsorbing solution has another disadvantage. That is, the mixing of the vapor of toluene used as the solvent into the collected carbon monoxide is unavoidable, making it necessary to further provide equipment for the removal of the toluene. Also, because of the use of a liquid form of adsorbent, restrictions are placed on the processing procedure.

Now, few solid form of adsorbents for carbon monoxide have been known. According to U.S. Pat. No. 4,019,879, copper (I) zeolite that is obtained by a reduction process conducted at a high temperature after having copper (II) ions adsorbed by the zeolite is capable of adsorbing the carbon monoxide. This adsorbent, however, has drawbacks in that the temperature required for its preparation is as high as 300° to 350° C. and that the dependence of the amount of carbon monoxide adsorbed upon the pressure and temperature is relatively small.

In addition to the above, various methods have been proposed, but none of them have proved satisfactory as the process for separating carbon monoxide from mixed gas.

SUMMARY OF THE INVENTION

Accordingly, it is the general object of the present invention to provide a simple and economical method for producing a solid form adsorbent for carbon monoxide that enables separation of carbon monoxide directly from mixed gas.

The carbon monoxide adsorbent obtained in accordance with the present invention is a solid material that is prepared by the following steps. First, a compound selected from the group of copper (I) halide; copper (I) oxide; copper (II) halide, carboxylate, sulfate, nitrate, basic salt or ammine complex salt; or copper (II) oxide is mixed into a solvent in order to form a solution or suspension. Active carbon is added to the solution or the suspension. Then, the solvent is removed using a process such as evacuation, distillation, etc.

The solid form adsorbent for carbon monoxide obtained is resistant to the water included in the mixed gas and is capable of separating the carbon monoxide directly from the mixed gas containing water, without forming corrosive gases, etc. Also, the separated carbon monoxide does not contain the solvent vapor from the carbon monoxide adsorbent making it unnecessary to provide the equipment to collect the solvent vapor.

Since the carbon monoxide adsorbent produced according to the present invention is solid, it can be handled conveniently. Furthermore, as the means for separation of carbon monoxide, it is possible to use packed tower systems, packed column systems, fluidized bed systems, etc. Furthermore, the method for producing this solid carbon monoxide adsorbent is simple and can use various materials easily obtainable. Hence, the preparation of a useful carbon monoxide adsorbent is facilitated by the process provided by the present invention.

DETAILED DESCRIPTION OF THE INVENTION

Hereunder, the present invention will be described in detail in conjunction with the actual examples.

Copper (I) halides referred to in this invention include copper (I) chloride, copper (I) fluoride, copper (I) bromide and copper (I) iodide. Also, copper (I) oxide may be used.

Copper (II) halides referred to in this invention include copper (II) chloride, copper (II) fluoride, copper (II) bromide and copper (II) iodide.

Copper (II) carboxylates referred to in this invention include copper (II) acetate and copper (II) formate.

Copper (II) basic salts referred to in this invention include basic copper (II) carbonate, basic copper (II) acetate, basic copper (II) phosphate.

Copper (II) ammine complex salts referred to in this invention include hexammine copper (II) chloride.

Active carbon used in this invention includes formed carbon, granulated carbon composed of crushed carbon and powdered carbon. As the starting material for the active carbon, wood, coconut husk, coal, petroleum pitch, etc. are used. As the method for activation of the carbon, activation systems using chemicals, gases, etc. can be used.

Solvents which can be used in this invention are water, aqueous solution containing hydrochloric acid or ammonium formate, primary or secondary alcohol having 1 to 7 carbon atoms, acetone, ethyl acetate, formic acid, acetic acid, benzene, toluene, propionitrile, acetonitrile and aqueous ammonica.

The ratio by weight of active carbon to copper (I) halide or copper (I) oxide used in the production of the carbon monoxide adsorbent according to the present invention is 0.5 to 60.0 with the preferred ratio by weight being 3.0 to 10.0. The ratio by weight of solvent to copper (I) halide or copper (I) oxide used is 3 to 200, and preferably 5 to 30.

The ratio by weight of active carbon to coper (II) salts or copper (II) oxide used according to the present invention is 0.5 to 60.0, and preferably 2.0 to 10.0. The ratio by weight of solvent to copper (II) salts or copper (II) oxide used is 1 to 200, and preferably 3 to 30.

The ambience used in this invention for the production of the adsorbent for carbon monoxide is nitrogen, helium, argon or air.

The time for mixing copper (I) halide, copper (I) oxide, copper (II) salts or copper (II) oxide in the solvent used in this invention is from one minute to ten hours, and preferably one to three hours. The temperature for stirring the mixture is between 10° and 80° C., with a preferred range of 20° to 30° C.

In this invention, the interval between the addition of the active carbon into the solution or the suspension of copper (I) halide, copper (I) oxide, copper (II) salts or copper (II) oxide and the start of removal of the solvent is from one minute to ten hours, and preferably one to three hours. The temperature during the time when the active carbon is in the solution is between 10° and 80° C., and preferably 20° to 30° C. Stirring the solution or suspension is desirable.

Furthermore, the evacuation for the removal of the solvent according to this invention is $10^{-6}$ to $10^{-2}$ mmHg and preferably $10^{-2}$ to 10 mmHg. The temperature at which the evacuation is performed is between 10° and 500° C. and preferably 80° to 250° C.

Furthermore, the carbon monoxide adsorbent, expecially in the type of copper (II) salts or copper (II) oxide can be more activated by applying heat to 30°-250° C., preferably 100° to 150° C. in reducing atmosphere, for example in carbon monoxide, hydrogen, etc. And further, the adsorbent in this type is resistance to sulfur compounds in the mixed gas and is capable of separating the carbon monoxide directly from the mixed gas containing sulfur compounds such as hydrogen sulfide, carbonyl sulfide, sulfur dioxide.

As will be demonstrated in the following examples, the carbon monoxide adsorbent obtained by following the teachings of the present invention quickly adsorbs carbon monoxide when it is exposed to mixed gas at one atm at a temperature between 0° and 40° C. The adsorbed carbon monoxide can be readily separated and discharged either by heating the carbon monoxide adsorbent to above 60° C. or by lowering the partial pressure of the carbon monoxide or both.

A further detailed description will hereunder given of the adsorbent for carbon monoxide and the method for producing the same with reference to the following examples.

EXAMPLE 1

In this example, for the copper (I) chloride, a special grade reagent from Koso Kagaku Yakuhin Co., Ltd. was used. For the hydrochloric acid, first grade reagent from Takahashi Tokichi Shoten was used after diluting it to 3N solution using purified water produced by Tokyo Yakuhin Kogyosho Co., Ltd. As the activated carbon, BAC, G-70R, Lot No. 810117 from Kureha Kagaku Co., Ltd. was used after giving it the following preliminary treatment. That is, it was heated to 180° C. and kept at this temperature for four hours under reduced pressure (6 mmHg) and then stored in dry nitrogen. The carbon monoxide gases and nitrogen gas used were cylinder gases produced respectively by Takachiho Kagaku Co., Ltd. (99.95% purity) and Suzuki Shokan Co., Ltd. (99.999% purity). Immediately prior to use, the gases were dried and purified by passing them through a packed tower Molecular Sieve 3A produced by Nikka Seiko Co., Ltd.

In an atmosphere of dry nitrogen, 1.5 g (15.2 m mol) of copper (I) chloride was placed in a 100 ml capacity double ported eggplant shaped flask; then, 15 ml of 3N hydrochloric acid was added while being stirred with a magnetic agitator. The mixture was kept at 20° C. for one hour. Into the eggplant shaped flask, 10 g of active carbon was added in an atmosphere of dry nitrogen. Then, after continuously stirring for one hour, the inside of the eggplant shaped flask was evacuated to 6 mm Hg and kept at 100° C. in order to remove the water and hydrogen chloride thoroughly. As a result, black grains were obtained. These black grains were the solid adsorbent of carbon monoxide.

The carbon monoxide adsorbent was introduced into a 100 ml double ported flask, which was connected to a container wherein 1.5 l of 1 atm mixed gas of carbon monoxide and nitrogen (0.9 atm of partial pressure of carbon monoxide and 0.1 atm of partial pressure of nitrogen) is contained. While stirring using a magnetic agitator, the adsorption of the carbon monoxide was carried out at 20° C. For ten minutes during the initial period of the adsorption, the mixed gas was circulated and passed over the adsorbent using a BA-106 T Model air pump manufactured by Iwaki Co., Ltd. The amount of carbon monoxide adsorbed was determined by means of a gas buret method at 20° C. The absorption of carbon monoxide occurred quickly with 6.4 m mol carbon monoxide adsorbed after three minutes. After sixty minutes, the carbon monoxide adsorbed amounted to 11.7 m mol and equilibrium in the amount of adsorption was nearly reached.

Next, the adsorbent was heated to 120° C. at 1 atm and the amount of gas discharged was determined using the gas buret method. The carbon monoxide was discharged quickly and the released amount became 11.7 m mol after ten minutes. The result of the analysis of the released gas using gas chromatography showed that the gas discharged was carbon monoxide with no other component detected.

Thereafter, the double ported eggplant shaped flask was connected to the container containing 1.5 l of 1 atm mixed gas composed of carbon monoxide and nitrogen (0.9 atm of partial pressure of carbon monoxide and 0.1 atm of partial pressure of nitrogen). The mixed gas was circulated over the adsorbent by means of an air pump while stirring with a magnetic agitator and the re-adsorption of carbon monoxide was performed at 20° C. Carbon monoxide was again adsorbed quickly with 6.6 m mol of carbon monoxide adsorbed after three minutes. The carbon monoxide adsorbed after 60 minutes amounted to 11.7 m mol and reached equilibrium. Furthermore, when the adsorbent was thereafter heated to 120° C., the carbon monoxide was discharged quickly and the amount released became 11.7 m mol afte ten minutes.

Following the above, even when the process of adsorption and discharge described above was performed repeatedly, no change was observed in the rate of adsorption of carbon monoxide as well as in the amount of carbon monoxide adsorbed.

Next, 5 l of 1 atm nitrogen gas containing 27 mg (1.5 m mol) of water (7,400 ppm in concentration of water) was prepared separately. The container with the above described nitrogen gas was connected to a 100 ml capacity double ported eggplant shaped flask. By using the BA-106 T Model air pump from Iwaki Co., Ltd., the nitrogen gas with water was circulated and passed over the adsorbent stirred by the magnetic agitator at 20° C. for ten minutes.

Then, while stirring the adsorbent at 20° C. using the magnetic agitator, the flask containing the adsorbent was connected to a container containing 1.5 l of 1 atm mixed gas of carbon monoxide and nitrogen (0.9 atm of partial pressure of carbon monoxide and 0.1 atm of partial pressure of nitrogen). The mixed gas was circulated over the adsorbent using the air pump. The adsorption went on rapidly and reached 11.7 m mol of carbon monoxide in 60 minutes. In other words, the rate of adsorption of carbon monoxide and the amount of carbon monoxide adsorbed showed almost no change in value from those prior to the exposure of the adsorbent to the gas containing 7,400 ppm of water.

EXAMPLE 2

Taking the same procedure as described in Example 1, the carbon monoxide adsorbent composed of 1.5 g (15.2 m mol) of copper (I) chloride and 10 g of active carbon was prepared. The adsorbent thus prepared was placed in a 100 ml capacity double ported eggplant shaped flask, which was to a container wherein 1.5 l of 1 atm mixed gas made up of carbon monoxide and nitrogen (0.9 atm in partial pressure of carbon monoxide and 0.1 atm of partial pressure of nitrogen) was contained. While stirring using a magnetic agitator, the adsorption of carbon monoxide occurred at 20° C. For ten minutes during the initial period of adsorption, the mixed gas was circulated and passed over the adsorbent using the BA-106 T Model air pump manufactured by Iwaki Co., Ltd. The amount of carbon monoxide adsorbed was determined at 20° C. using the gas buret method.

The adsorption of carbon monoxide occurred quickly and amounted to 6.6 m mol of carbon monoxide after three minutes. The amount of carbon monoxide adsorbed during sixty minutes became 11.7 m mol and reached nearly equilibrium.

Next, by using a vacuum pump, the inside of the double ported eggplant shape flask was evacuated to 6 mm Hg at 20° C. for ten minutes in order to release the adsorbed carbon monoxide.

Thereafter, the double ported eggplant shaped flask was connected to a container containing 1.5 l of carbon monoxide at 1 atm. While stirring with a mangetic agitator, the adsorption of carbon monoxide was carried out at 20° C. The adsorption of carbon monoxide occurred quickly and after three minutes, 7.0 m mol carbon monoxide was adsorbed. After sixty minutes, the amount of carbon monoxide adsorbed became 11.7 m mol and reached nearly equilibrium.

After the above, repetition of the same operation described resulted in no variation in the rate of adsorption of carbon monoxide and in the amount of carbon monoxide adsorbed.

EXAMPLE 3

The carbon monoxide solid adsorbent was prepared in the same manner as that described in Example 1 except that acetonitrile of a special grade from Wako Junyaku Kogyo Co., Ltd. was used instead of the 3N hydrochloric acid.

In an atmosphere of dry nitrogen, 1.5 g (15.2 m mol) of copper (I) chloride and 10 g of active carbon were introduced into a 100 ml capacity eggplant shaped flask equipped with a reflux condenser. Then, 15 ml of acetonitrile was added. While stirring using a magnetic agitator, the contents were heated to 90° C. and maintained at that temperature for one hour. Thereafter, the inside of the flask was evacuated to 6 mm Hg and heated to 100° C. to remove the acetonitrile thoroughly. As a result, black grains were obtained and these black grains were the solid adsorbent for carbon monoxide.

Using the same operation as described in Example 1, the amount of carbon monoxide adsorbed was determined. The amount of carbon monoxide adsorbed became 3.7 m mol after three minutes and became 6.2 m mol after sixty minutes to reach nearly equilibrium.

Next, the adsorbent was heated to 120° C. at 1 atm and the amount of gas released was determined by means of the gas buret method. The carbon monoxide was discharged quickly amounting to 6.1 m mol after ten minutes. Gas chromatography analysis of the discharged gas showed that the released gas was carbon monoxide with no other component.

Then, the double ported eggplant shaped flask was connected to a container containing 1.5 l of 1 atm mixed gas of carbon monoxide and nitrogen (0.9 atm of partial pressure of carbon monoxide and 0.1 atm of partial pressure of nitrogen). The mixed gas was circulated over the adsorbent using an air pump while stirring with a magnetic agitator and the re-adsorption of carbon monoxide was carried out at 20° C. The carbon monoxide was adsorbed quickly amounting to 3.7 m mol after three minutes. After sixty minutes, the amount of carbon monoxide adsorbed became 5.8 m mol to reach nearly equilibrium. The foregoing adsorbent was then heated to 120° C. with the result that the carbon monoxide was discharged quickly and amounted to 5.8 m mol after ten minutes.

Even when the adsorption and discharge procedure was repeated, no variation occurred in the rate of the adsorption of the carbon monoxide as well as in the amount of carbon monoxide adsorbed.

EXAMPLE 4

The solid carbon monoxide adsorbent was again prepared as described in Example 1 except 15 ml of purified water from Tokyo Yakuhin Kogyosho Co. Ltd. was used instead of 15 ml of 3N hydrochloric acid. Otherwise the reagents were the same as in Example 1. Taking the same procedure as described in Example 1, the adsorption of the carbon monoxide was carried out and the amount of carbon monoxide adsorbed was determined. It was found that the amount of carbon monoxide adsorbed during the first three minutes was 4.7 m mol and the amount adsorbed after sixty minutes was 6.7 m mol to reach nearly equilibrium.

Next, when the adsorbent was heated to 120° C. at 1 atm, the carbon monoxide was released quickly and the amount of carbon monoxide discharged reached to 6.7 m mol after ten minutes. An analysis of the discharge gas using gas chromatography showed that the discharged gas was carbon monoxide without other components.

Then, the re-adsorption of carbon monoxide was performed in the same manner described in Example 1. The adsorption of carbon monoxide occurred rapidly with 4.3 m mol of carbon monoxide adsorbed after three minutes. The amount of carbon monoxide adsorbed after sixty minutes amounted to 6.7 m mol and reached nearly equilibrium. Thereafter, the adsorbent was heated to 120° C. with the result that the carbon monoxide was discharged rapidly and amounted to 6.7 m mol after ten minutes.

Thereafter, even when the adsorption and discharge process were repeatedly done, the rate of adsorption of carbon monoxide and the amount of carbon monoxide adsorbed remained constant.

EXAMPLE 5

The solid carbon monoxide was again prepared in the same manner as Example 1 except that instead of 10 g of active carbon (BAC, G-70R), 10 g of active carbon from Takeda Yakuhin Kogyo Co., Ltd., Granular Shirasagi $C_2$ X 4/6-3, SGW-079, which is produced from coconut husk charcoal as the raw material and activated by steam was used. Other than the above, the same reagents as in Example 1 was used.

In an atmosphere of dry nitrogen, 1.5 g (15.2 m mol) of copper (I) chloride was placed in a 100 ml capacity double ported eggplant shaped flask. Then, 15 ml of 3N hydrochloric acid was added. The mixture was stirred by a magnetic agitator at 20° C. for two hours. Into the eggplant shaped flask, 10 g of the active carbon was added in an atmosphere of dry nitrogen. After stirring continuously for two hours, the pressure in the eggplant shaped flask was reduced to 6 mm Hg. The content was also heated to 120° C. and maintained at that temperature in order to remove the water and hydrogen chloride thoroughly. As a result, black grains were obtained and these black grains were the adsorbent for carbon monoxide.

Following the same procedure as used in Example 1, the amount of carbon monoxide adsorbed was determined. The amount of carbon monoxide adsorbed in the first three minutes amount to 5.6 m mol and after sixty minutes 6.2 m mol.

Next, the adsorbent was heated to 120° C. at 1 atm and the carbon monoxide discharged quickly. The amount of carbon monoxide released was 6.2 m mol after ten minutes. Gas chromatography analysis of the released gas indicated that the gas discharged was carbon monoxide with no other component.

EXAMPLE 6

The solid carbon monoxide adsorbent was again prepared in the same manner as Example 1 except that 28 percent aqueous ammonia which is a first grade reagent from Takahashi Tokichi Shoten was used instead of the 15 ml of 3N hydrochloric acid described in Example 1. Otherwise the same reagents as in Example 1 was used.

In an atmosphere of dry nitrogen, 1.5 g (15.2 m mol) of copper (I) chloride was introduced into a 100 ml capacity double ported eggplant shaped flask. Then, 20 ml of the aqueous ammonia was added. The mixture was stirred by a magnetic agitator for one hour at 20° C. Into the foregoing eggplant shaped flask, 10 g of active carbon was added in an atmosphere of dry nitrogen and the contents of the flask were further stirred continuously for one hour. Thereafter, the inside of eggplant shaped flask was evacuated to 6 mm Hg and kept at 80° C. by heating in order to remove the aqueous ammonia thoroughly. As a result, black grains were obtained and these black grains were the carbon monoxide adsorbent.

Using the same procedure as in Example 1, the amount of carbon monoxide adsorbed was determined. The result showed that after three minutes, 7.8 m mol of carbon monoxide was adsorbed while after sixty minutes 10.4 m mol of carbon monoxide was adsorbed. Next, when the adsorbent was heated to 120° C. at 1 atm, carbon monoxide was released quickly and 10.4 m mol of carbon monoxide was released after 10 minutes. The released gas was analyzed by means of gas chromatography and was found that the gas discharged was carbon monoxide with no other components:

EXAMPLE 7

The solid carbon monoxide adsorbent was again compared in the same manner as in Example 1 except that 1.1 g (7.6 m mol) of copper (I) oxide from Koso Kagaku Yakuhin Co., Ltd. was used instead of 15.2 m mol of copper (I)chloride in Example 1. Otherwise, the same reagents as in Example 1 were employed. Taking the same procedure as described in Example 1, the adsorption of the carbon monoxide was carried out and the amount of carbon monoxide adsorbed was determined with the result that 4.6 m mol of carbon monoxide was adsorbed after three minutes and 5.4 m mol of carbon monoxide was adsorbed after sixty minutes. Next, the adsorbent was heated to 120° C. at 1 atm to discharge carbon monoxide. The carbon monoxide was discharged quickly and amounted to 5.4 m mol after ten minutes. Analysis by gas chromatography of the released gas showed that the discharge gas was carbon monoxide with no other component identified.

EXAMPLE 8

The same reagents as those used in Example 1 are utilized in this example and the solid carbon monoxide adsorbent was prepared as described in Example 1 except that both the charge of 1.5 g of copper (I) chloride and that of 10 g of active carbon into the eggplant shaped flask were carried out in an atmosphere of air instead of in an atmosphere of dry nitrogen.

By employing the same procedure as in Example 1, the amount of carbon monoxide adsorbed was determined. The amount of carbon monoxide adsorbed after three minutes was 8.0 m mol and after sixty minutes the amount of carbon monoxide adsorbed was 10.1 m mol. Next, when the adsorbent was heated to 120° C. at 1 atm, the carbon monoxide was discharged at a high rate and amounted to 10.1 m mol after ten minutes. Analysis of the discharged gas using gas chromatography showed that the gas released was carbon monoxide with no other components.

EXAMPLE 9

The solid carbon monoxide adsorbent was again prepared in the same manner as in Example 1 except copper (I) bromide from Yoneyama Yakuhin Kogyo Co., Ltd. was used instead of 15.2 m mol of copper (I) chloride of Example 1. Also, 28 percent aqueous ammonia from Takahashi Tokichi Shoten was used instead of 15 ml of 3N hydrochloric acid. Otherwise, the same reagents were used as in Example 1.

In at atmosphere of dry nitrogen, 2.2 g (15.2 m mol) of copper (I) bromide was added into a 100 ml capacity double ported eggplant shaped flask. Then, 15 ml of aqueous ammonia was added. The mixture was stirred using a magnetic agitator at 20° C. for one hour. Into the eggplant shaped flask was then added 10 g of activated carbon in an atmosphere of dry nitrogen and the stirring was continued for one hour. Thereafter, the pressure in the eggplant shaped flask was reduced to 6 mm Hg and by keeping the temperature at 100° C., the aqueous ammonia was removed thoroughly. The resulted product was the carbon monoxide adsorbent in the form of black grains.

By utilizing the same procedure as in Example 1, the amount of carbon monoxide adsorbed was determined. The amount of carbon monoxide adsorbed after three minutes was 5.7 m mol and after sixty minutes was 9.4 m mol. Next, the adsorbent was heated to 120° C. at 1 atm. This caused the carbon monoxide to be released at a high rate. The amount of carbon monoxide thus released was 9.4 m mol after ten minutes. Gas chromatographic analysis of the discharged gas showed that the gas released was carbon monoxide with no other components.

EXAMPLE 10

In this example, copper (I) oxide produced by Kose Kagaku Yakuhin Co., Ltd. was used. For the aqueous ammonia, first grade reagent 28 percent aqueous ammonia from Takahashi Tokichi Shoten was utilized. Formic acid of a special grade produced by Nakarai Kagaku Yakuhin Co., Ltd. was used and the active carbon, carbon monoxide gas and nitrogen gas used were same as those used in Example 1.

In at atmosphere of dry nitrogen, 1.1 g (7.6 m mol) of copper (I) oxide was introduced into a 100 ml capacity double ported eggplant shaped flask. Then, 5 ml of formic acid and 20 ml of aqueous ammonia were added. The mixture was stirred by a magnetic agitator at 20° C. for one hour. Into the eggplant shaped flask was introduced 10 g of active carbon in an atmosphere of dry nitrogen. After the contents of the flask were further stirred for one hour, the pressure in the eggplant shaped flask was reduced to 6 mm Hg with heating to 100° C. in order to remove the formic acid, ammonia and water thoroughly. The resulting product was in the form of black grain and was the adsorbent for carbon monoxide.

In accordance with the same method described in Example 1, the amount of carbon monoxide was determined. After three minutes, the carbon monoxide adsorbed was 6.7 m mol and after sixty minutes the amount of carbon monoxide adsorbed was 9.1 m mol. Next, the adsorbent was heated to 120° C. at 1 atm. As a result, the carbon monoxide was released quickly and amounted to 9.1 m mol after ten minutes. An analysis by gas chromatography conducted on the discharged gas revealed that the gas released was carbon monoxide and no other components were detected.

EXAMPLE 11

In this example, copper (I) chloride of a special grade reagent from Komune Kagaku Yakuhin Co., Ltd. was used. Also, ammonia formate of the first reagent grade from Koso Kagaku Yakuhin Co., Ltd was used. As the 28 percent of aqueous ammonia a first grade reagent produced by Takahashi Tokichi Shoten was used. Otherwise, for the active carbon, carbon monoxide gas and nitrogen gas, the same ones as those used in Example 1 were used.

In the atmosphere of dry nitrogen, 1.5 g (15.2 m mol) of copper (I) chrolide and 3 g (47.6 m mol) of ammonia formate were introduced into a 100 ml capacity double ported eggplant shaped flask. Then, 15 ml of aqueous ammonia was added. The mixture stirred by a magnetic agitator was left at 20° C. for one hour. Into the eggplant shaped flask was then introduced 10 g of active carbon in an atmosphere of dry nitrogen. After the contents of flask were further stirred for one hour, the inside pressure of the eggplant shaped flask was reduced to 6 mm Hg with heating to 180° C. so that the aqueous ammonia and water were removed thoroughly leaving black grains. These black grains are the adsorbent for carbon monoxide.

Through the same method as described in Example 1, the amount of carbon monoxide adsorbed was determined. The amount of carbon monoxide adsorbed in three minutes was 7.3 m mol and after sixty minutes the amount of carbon monoxide adsorbed was 9.3 m mol. Next, the adsorbent was heated to 120° C. at 1 atm. The carbon monoxide was released quickly and reached 9.3 m mol by the end of ten minutes. An analysis of the released gas by gas chromatography showed that the gas discharged was carbon monoxide and no other components were identified.

EXAMPLE 12

In this example, for the copper (II) chloride, a special grade reagent from Koso Kagaku Yakuhin Co., Ltd. was used. The purified water from Tokyo Yakuhin Kogyosho Co., Ltd. was used and the active carbon, carbon monoxide gas and nitrogen gas used were the same as those usd in Example 1.

In an atmosphere of dry nitrogen, 2.6 g (15.0 m mol) of copper (II) chloride was placed in a 100 ml capacity double ported eggplant shaped flask; then, 15 ml of purified water was added while being stirred with a magnetic agitator. The mixture was kept at 20° C. for one hour. Into the eggplant shaped flask, 10 g of active carbon was added in the atmosphere of dry nitrogen. Then, after the contents of the flask were further stirred for one hour, the inside of the eggplant shaped flask was evacuated to 6 mm Hg and kept at 100° C. by heating in order to remove the water thoroughly. As a result, black grains were obtained. These black grains thus obtained were the solid adsorbent of carbon monoxide. Taking the same procedure described in Example 1, the amount of carbon monoxide adsorbed was determined by means of a gas buret method at 20° C. The adsorption of carbon monoxide occurred quickly with 3.3 m mol carbon monoxide adsorbed after three minutes. After sixty minutes, the carbon monoxide adsorbed amounted to 4.3 m mol and reached nearly equilibrium.

Next, by using a vacuum pump, the inside of the double ported eggplant shaped flask was evacuated to 0.4 mm Hg at 20° C. for ten minutes in order to release the adsorbed carbon monoxide. Then, the re-adsorption of carbon monoxide was performed in the same manner as described in Example 1. The adsorption of carbon monoxide occurred rapidly with 3.3. m mol of carbon monoxide adsorbed after three minutes. The amount of carbon monoxide adsorbed after sixty minutes amounted to 4.3 m mol and reached nearly equilibrium.

Thereafter, the inside of the double ported eggplant shaped flask was again evacuated to 0.4 mm Hg at 20° C. for ten minutes by using a vacuum pump and the adsorbed carbon monoxide was released.

Following the above, even when the process of adsorption and discharge described above was performed repeatedly, no change was observed in the rate of adsorption of carbon monoxide as well as in the amount of carbon monoxide adsorbed.

EXAMPLE 13

Taking the same procedure as described in Example 12, the carbon monoxide adsorbent composed of 2.6 g (15.0 m mol) of copper (II) chloride and 10 g of active carbon was prepared. In accordance with the method described in Example 1, the adsorption of carbon monoxide was carried out and the amount of carbon monoxide adsorbed was determined at 20° C. using the gas buret method. The amount of carbon monoxide adsorbed in the first three minutes amounted to 3.3 m mol and after sixty minues 4.3 m mol.

Next, the adsorbent was heated to 120° C. at 1 atm and the carbon monoxide was released quickly. The amount of carbon monoxide discharged amount to 4.3 m mol after ten minutes. An analysis of the discharged gas using gas chromatography showed that the discharged gas was carbon monoxide with no other components.

Then, the re-adsorption of carbon monoxide was performed in the same manner as described in Example 1. The adsorption of carbon monoxide occurred rapidly with 4.9 m mol of carbon monoxide adsorbed after three minutes and 5.9 m mol of carbon monoxide was adsorbed after sixty minutes.

Thereafter, the adsorbent was again heated to 120° C. and the carbon monoxide was released quickly. The amount of carbon monoxide discharged amounted to 5.9 m mol after ten minutes.

Furthermore, the re-adsorption of carbon monoxide was again performed in the same manner as described in Example 1. The adsorption occurred rapidly and 5.9 m mol of carbon monoxide was adsorbed after sixty minutes.

Next, the adsorbent was again heated to 120° C. at 1 atm. The carbon monoxide was released quickly and the amount discharged was 5.9 m mol after ten minutes. An analysis of the discharge gas using gas chromatography showed that the discharge gas was carbon monoxide with no other component identified.

Even when the process of adsorption and discharge described above was performed repeatedly, no change was observed in the rate of adsorption of carbon monoxide as well as in the amount of carbon monoxide adsorbed.

EXAMPLE 14

The solid adsorbent composed of 2.6 g (15.0 m mol) of copper (II) chloride and 10 g of active carbon was prepared in the same manner as described in Example 12. The resulting carbon monoxide adsorbent was used after incubation at 120° C. for thirty minutes in an atmosphere of carbon monoxide.

Taking the same procedure described in Example 1, the adsorption of carbon monoxide in the mixed gas of carbon monoxide and nitrogen was carried out and the amount of carbon monoxide adsorbed was measured at 20° C. using the gas buret method. The adsorption occurred quickly and 5.0 m mol of carbon monoxide was adsorbed after three minutes while 5.8 m mol was adsorbed after sixty minutes.

Next, the adsorbent was heated to 120° C. at 1 atm and the amount of carbon monoxide discharged was determined. The carbon monoxide was released quickly and after ten minutes the amount discharged was 5.8 m mol. The gas chromatography analysis showed that the discharge gas was carbon monoxide with no other component identified.

The re-adsorption of carbon monoxide was performed in the same manner as described in Example 1. The adsorption of carbon monoxide occurred rapidly. After three minutes, 4.9 m mol of carbon monoxide was adsorbed and 5.7 m mol of carbon monoxide was adsorbed after sixty minutes.

Thereafter, the adsorbent was again heated to 120° C. and the carbon monoxide was released quickly. The amount discharged was 5.7 m mol after 10 minutes.

No change was observed in the rate of adsorption of carbon monoxide as well as in the amount of carbon monoxide adsorbed, even when the process of adsorption and discharge described above was performed repeatedly.

EXAMPLE 15

The carbon monoxide adsorbent was prepared by heating the solid adsorbent obtained in the same manner as described in Example 12 to 100° C. for one hour in an atmosphere of hydrogen.

Using the same method as in Example 1, the amount of carbon monoxide adsorbed was determined. 4.5 m mol of carbon monoxide was adsorbed after three minutes and 5.6 m mol adsorbed after sixty minutes.

Next, by using a vacuum pump, the inside of the double ported eggplant shaped flask was evacuated to 0.4 mm Hg at 20° C. for ten minutes to release the adsorbed carbon monoxide.

Then, the re-adsorption of carbon monoxide was performed in the same manner as described in Example 1. The carbon monoxide was rapidly adsorbed with the amount of 4.5 m mol after three minutes and the amount of 5.6 m mol after sixty minutes.

Thereafter, the adsorbed carbon monoxide was again released by evacuating again the inside of the flask to 0.4 mm Hg at 20° C. for ten minutes by using a vacuum pump.

Further repeated process of adsorption and discharge described above showed no change in the rate of adsorption as well as in the amount of adsorped carbon monoxide.

EXAMPLE 16

The carbon monoxide adsorbent subjected to heat treatment in the atmosphere of carbon monoxide in the same manner as described in Example 14 was used.

The amount of carbon monoxide adsorbed was determined in the same method as in Example 1. After three minutes, 5.0 m mol of carbon monoxide was adsorbed and after sixty minutes 5.8 m mol adsorbed was.

Next, the adsorbent was heated to 120° C. at 1 atm and the carbon monoxide adsorbed was rapidly released. The amount discharged after ten minutes was 5.8 m mol.

Thereafter, the adsorbent was kept at 20° C. in 1 atm hydrogen sulfide for sixteen hours. The amount of carbon monoxide re-adsorbed was determined using the same method as described in Example 1. 1.6 m mol of carbon monoxide was adsorbed after three minutes, 5.8 m mol adsorbed after ten minutes and 6.0 m mol adsorbed after sixty minutes.

Then, the adsorbed carbon monoxide was released by evacuating the inside of the flask to 0.4 mm Hg at 20° C. for ten minutes by using a vacuum unit.

Further, the re-adsorption of carbon monoxide was performed in the same manner as in Example 1 and the amount of carbon monoxide adsorbed was determined. After three minutes, 5.0 m mol of carbon monoxide was adsorbed, and after sixty minutes 6.0 m mol was adsorbed.

Hence, the adsorption activity of the adsorbent was little affected after being subjected to the hydrogen sulfide.

EXAMPLE 17

The carbon monoxide adsorbent was again prepared in the same manner as in Example 12 except copper (II) bromide from Yoneyama Yakuhin Kogyo Co., Ltd. was used instead of 15.0 m mol of copper (II) chloride of Example 12. Also, methanol of a special grade reagent produced by Nakarai Kagaku Yakuhin Co., Ltd. was used instead of 15 ml of purified water.

In an atmosphere of dry nitrogen, 3.4 g (15.0 m mol) of copper (II) bromide was added into a 100 ml capacity double ported eggplant shaped flask. Then, 15 ml of methanol was added. The mixture was stirred using a magnetic agitator at 20° C. for one hour. Into the eggplant shaped flask was then added 10 g of active carbon in an atmosphere of dry nitrogen and the stirring was continued for one hour. Thereafter, the pressure in the eggplant shaped flask was reduced to 6 mm Hg at 100° C. and the methanol was removed thoroughly. The resulted product was the carbon monoxide adsorbent in the form of balck grains.

By utilizing the same procedure as in Example 1, the amount of carbon monoxide adsorbed was determined. The amount of carbon monoxide adsorbed after three minutes was 2.8 m mol and after sixty minutes was 5.7 m mol. Next, the adsorbent was heated to 120° C. at 1 atm. The carbon monoxide was released rapidly. The amount of carbon monoxide thus released was 5.7 m mol after ten minutes. Gas chromatographic analysis of the discharged gas showed that the gas released was carbon monoxide with no other components.

EXAMPLE 18

Taking the same procedure as described in Example 12, the carbon monoxide adsorbent composed of 2.6 g (15.0 m mol) of copper (II) chloride and 10 g of active carbon was prepared.

In an atmosphere of dry nitrogen, 2.6 g (15.0 m mol) of copper (II) chloride was introduced into a 100 ml capacity double ported eggplant shaped flask. Then, 15 ml purified water was added. The mixture was stirred by a magnetic agitator at 20° C. for an hour. Into the eggplant shaped flask, 10 g of active carbon was then added in an atmosphere of air.

After the contents of the flask were further stirred for one hour, the pressure in the eggplant shaped flask was reduced to 6 mm Hg at 180° C. and the purified water was removed thoroughly. As a result, black grains were obtained and these black grains were the carbon monoxide adsorbents.

By using the same operation as described in Example 1, the amount of carbon monoxide adsorbed was determined. The amount of carbon monoxide adsorbed after three minutes was 6.9 m mol and the amount adsorbed after sixty minutes was 8.6 m mol.

Next, the adsorbent was heated to 120° C. at 1 atm. The carbon monoxide was released rapidly and the amount discharged was 8.6 m mol after ten minutes. Gas chromatography analysis showed that the gas released was carbon monoxide with no other components.

EXAMPLE 19

The carbon monoxide adsorbent was prepared by heating the solid adsorbent obtained in the same manner as described in Example 12 to 180° C. for one hour in an atmosphere of hydrogen.

Using the same method as in Example 1, the amount of carbon monoxide adsorbed was determined. The amount of carbon monoxide adsorbed after three minutes was 5.0 m mol and after sixty minutes was 7.9 m mol.

Next, the adsorbent was heated to 120° C. at 1 atm. The carbon monoxide was released rapidly and the amount released was 7.9 m mol after ten minutes. The gas released was carbon monoxide with no other components.

EXAMPLE 20

The solid adsorbent composed of 2.6 g (15.0 m mol) of copper (II) chloride and 10 g of active carbon was prepared in the same manner as described in Example 12 and the carbon monoxide adsorbent was used after incubation at 120° C. for thirty minutes in an atmosphere of carbon monoxide.

Taking the same procedure described in Example 1, the amount of carbon monoxide adsorbed from the mixed gas was measured. 5.0 m mol of carbon monoxide was adsorbed after three minutes and 5.8 m mol was adsorbed after sixty minutes.

Next, the adsorbent was heated to 120° C. at 1 atm and the amount of carbon monoxide released was determined. The carbon monoxide was released quickly and the amount released was 5.8 m mol after ten minutes. No component other than carbon monoxide was detected.

Furthermore, 5 liter of 1 atm nitrogen gas containing 27 mg (1.5 m mol) of water (7,400 ppm of water) was prepared separately. The container with said nitrogen gas was connected to a 100 ml capacity double ported eggplant shaped flask. Using the BA-106 T Model air pump manufactured by Iwaki Co., Ltd., the nitrogen gas was circulated and passed over the adsorbent at 20° C. for ten minutes while the adsorbent was stirred by the magnetic agitator.

Thereafter, while the adsorbent was stirred at 20° C. by a magnetic agitator, the flask was connected to a container containing 1.5 liter of 1 atm mixed gas composed of carbon monoxide and nitrogen (0.9 atm of partial pressure of carbon monoxide and 0.1 atm of partial pressure of nitrogen). Using an air pump, the mixed gas was circulated over the adsorbent in order to adsorb the carbon monoxide. The adsorption of carbon monoxide occurred rapidly with 5.8 m mol adsorbed in sixty minutes. As a result, the rate of adsorption of carbon monoxide and the amount of carbon monoxide adsorbed stayed unvaried even though the adsorbent was exposed to a gas containing 7,400 ppm of water.

EXAMPLE 21

The carbon monoxide adsorbent was prepared in the same manner as in Example 12 except copper (II) sulfate anhydride from Yoneyama Yakuhin Kogyo Co., Ltd. was used instead of 15.0 m mol of copper (II) chloride in Example 12.

In an atmosphere of dry nitrogen 2.4 g (15.0 m mol) of copper (II) sulfate anhydride was introduced into a 100 ml capacity double ported eggplant shaped flask. Then, 15 ml of purified water was added. The mixture was stirred by a magnetic agitator at 20° C. for one hour. Into the eggplant shaped flask was introduced 10 g of active carbon. After the contents of the flask were further stirred for one hour, the pressure in the eggplant shaped flask was reduced to 6 mm Hg at 100° C. to remove the water thoroughly. As a result, black grains were obtained. These black grains were the adsorbents for carbon monoxide.

Using the same method as in Example 1, the amount of carbon monoxide adsorbed was determined. After three minutes, 0.5 m mol of carbon monoxide was adsorbed and after sixty minutes 1.2 m mol of carbon monoxide was adsorbed. Next, the adsorbent was heated to 120° C. at 1 atm. The carbon monoxide was released quickly and 1.2 m mol of carbon monoxide was released after 10 minutes. The released gas was analyzed by means of gas chromatography and was found that the gas discharged was carbon monoxide with no other component.

EXAMPLE 22

The solid carbon monoxide adsorbent was again prepared in the same manner as in Example 12 except copper (II) oxide from MERCK was used instead of 15.0 m mol of copper (II) chloride. Also, 28 percent aqueous ammonia from Takahashi Tokichi Shoten was used instead of 15 ml of purified water. Otherwise, the same reagents were used as in Example 12.

In an atmosphere of dry nitrogen, 1.2 g (15.0 m mol) of copper (II) oxide was added into a 100 ml capacity double ported eggplant shaped flask. Then, 15 ml of aqueous ammonia was added. The mixture was stirred using a magnetic agitator at 20° C. for one hour. Into the eggplant shaped flask was then added 10 g of active carbon in an atmosphere of dry nitrogen and the stirring was continued for one hour. Thereafter, the pressure in the eggplant shaped flask was reduced to 6 mm Hg at 100° C. to remove aqueous ammonica thoroughly. The resulted product was the carbon monoxide adsorbent in the form of black grains.

By utilizing the same procedure as in Example 1, the amount of carbon monoxide adsorbed was determined. The amount of carbon monoxide adsorbed after three minutes was 0.9 m mol and after sixty minutes was 1.8 m mol. Next, the adsorbent was heated to 120° C. at 1 atm. The carbon monoxide was released rapidly. The amount of carbon monoxide thus released was 1.8 m mol after ten minutes. The gas released was carbon monoxide with no other components.

EXAMPLE 23

The carbon monoxide adsorbent was prepared in the same manner as in Example 12 except copper (II) sulfate anhydride from Yoneyama Yakuhin Kogyo Co., Ltd. was used instead of copper (II) chloride in Example 12. Also, 35 percent hydrochroric acid from Takahashi Tokichi Shoten was used instead of 15 ml of purified water.

In an atmosphere of dry nitrogen, 2.4 g (15.0 m mol) of copper (II) sulfate anhydride was added into a 100 ml capacity double ported eggplant shaped flask. Then, 15 ml of 30 percent hydrochroric acid was added. The mixture was stirred using a magnetic agitator at 20° C. for one hour. Into the eggplant shaped flask was then added 10 g of active carbon in an atmosphere of dry nitrogen and the stirring was continued for one hour. Thereafter, the pressure in the eggplant shaped flask was reduced to 6 mm Hg 100° C. to remove the water and hydrogen chloride thoroughly. The resulted product was the carbon monoxide adsorbent in the form of black grains.

By utilizing the same procedure as in Example 1, the amount of carbon monoxide adsorbed was determined. The amount of carbon monoxide adsorbed after three minutes was 3.0 m mol and after sixty minutes was 5.8 m mol. Next, the adsorbent was heated to 120° C. at 1 atm to release the carbon monoxide quickly. The amount released was 5.8 m mol and no other component than carbon monoxide was detected.

EXAMPLE 24

In this example, copper (II) oxide from MERCK was used instead of 15 m mol of copper (II) chloride in Example 12. Also, 35 percent hydrochloric acid from Takahashi Tokichi Shoten was used instead of 15 ml of purified water after diluting it to 5N solution using purified water from Tokyo Yakuhin Kogyosho Co., Ltd.

In an atmosphere of dry nitrogen, 1.2 g (15.0 m mol) of copper (II) oxide was placed in a 100 ml capacity double ported eggplant shaped flask. Then 15 ml of 5N hydrochloric acid was added while being stirred with a magnetic agitator. The mixture was kept at 20° C. for one hour. Into the eggplant shaped flask, 10 g of active carbon was added in an atmosphere of dry nitrogen. Then, after the stirring was continued for one hour, the pressure of the eggplant shaped flask was evacuated to 6 mm Hg at 100° C. in order to remove the water and hydrogen chloride thoroughly. As a result, black grains were obtained. These black grains thus obtained were the solid adsorbent of carbon monoxide.

Taking the same procedure described in Example 1, the amount of carbon monoxide adsorbed was determined. The amount of carbon monoxide adsorbed after three minutes was 1.5 m mol and after sixty minutes was 3.9 m mol. The adsorbent was heated to 120° C. at 1 atm and the carbon monoxide was released quickly. The amount released was 3.9 m mol after ten minutes. No other component than carbon monoxide was detected.

EXAMPLE FOR COMPARISON

The same reagents described in Example 1 were utilized. In an atmosphere of dry nitrogen, 1.5 g (15.2 m mol) of copper (I) chloride was introduced into 100 ml capacity double ported eggplant shaped flask. Then, 15 ml of 3N hydrochloric acid was added. The mixture was stirred by a magnetic agitator at 20° C. for one hour. Thereafter, the pressure in the eggplant shaped flask was reduced to 6 mm Hg at 100° C. to remove the water and hydrogen chloride thoroughly. As a result, a white powder was obtained.

The container having the white powder was connected to a container containing 1.5 l of 1 atm of mixed gas (0.9 atm of partial pressure of carbon monoxide and 0.1 atm of partial pressure of nitrogen). While stirring with the magnetic agitator, the white powder was placed in contact with the mixed gas at 20° C. For ten minutes during the initial period of contact, the mixed gas was circulated and passed over the white powder using the BA-106 T Model air pump manufactured by Iwaki Co., Ltd. The amount of carbon monoxide adsorbed was determined by means of the gas buret method. The amount of carbon monoxide adsorbed after sixty minutes was 0 m mol and almost no adsorption of carbon monoxide by the white powder was observed.

It should be apparent to those skilled in the art that the above described embodiments and examples are merely a few of the many possible specific embodiments and examples of the present invention. Numerous and varied other embodiments and examples are possible without departing from the spirit and scope of the invention.

We claim:

1. A method for removing carbon monoxide from mixed gas comprising:
   contacting the mixed gas with a solid carbon monoxide adsorbent in a container to adsorb the carbon monoxide from the mixed gas, said carbon monoxide adsorbent obtained by:
   adding a copper compound to a solvent;
   stirring the copper compound and solvent;
   adding active carbon to the stirred copper compound and solvent;
   stirring the active carbon, copper compound and solvent; and
   removing solvent; and
   releasing carbon monoxide adsorbed by the adsorbent.

2. A method for removing carbon monoxide from mixed gas, comprising:
   contacting the mixed gas with a solid carbon monoxide adsorbent in a container to adsorb the carbon monoxide from the mixed gas, said carbon monoxide adsorbent being obtained by:
   adding a copper compound to a solvent;
   stirring the copper compound and solvent;
   adding active carbon to the stirred copper compound and solvent;
   stirring the active carbon, copper compound and solvent; and
   removing the solvent; and
   releasing the carbon monoxide adsorbed by reducing the pressure in the container.

3. A method for removing carbon monoxide from mixed gas, comprising:
   contacting the mixed gas with a solid carbon monoxide adsorbent in a container to adsorb the carbon monoxide from the mixed gas, said carbon monoxide adsorbent being obtained by:
   adding a copper compound to a solvent;
   stirring the copper compound and solvent;
   adding active carbon to the stirred copper compound and solvent;
   stirring the active carbon, copper compound and solvent; and
   removing the solvent; and
   releasing the carbon monoxide adsorbed by lowering the partial pressure of the carbon monoxide in the container.

4. A method for removing carbon monoxide from mixed gas claimed in claim 1, wherein the copper compound is copper (I) halide.

5. A method for removing carbon monoxide from mixed gas claimed in claim 1, wherein the copper compound is copper (II) halide.

6. A method for removing carbon monoxide from mixed gas claimed in claim 1, wherein the solvent is one selected from the group consisting of water, aqueous solution containing hydrochloric acid, benzene, toluene, propionitrile, acetonitrile, formic acid, acetic acid, aqueous ammonia, ammoniacal formic acid aqueous solution, acetone, ethyl acetate and primary or secondary alcohols having 1 to 7 carbon atoms.

* * * * *

UNITED STATES PATENT AND TRADEMARK OFFICE
CERTIFICATE OF CORRECTION

PATENT NO. : 4,587,114
DATED : May 6, 1986
INVENTOR(S) : Hidefumi Hirai, et al

It is certified that error appears in the above—identified patent and that said Letters Patent is hereby corrected as shown below:

On the title page:
At [54], change "METHOD FOR SEPARATING CARBON DIOXIDE FROM MIXED GAS" to --METHOD FOR SEPARATING CARBON MONOXIDE FROM MIXED GAS--.

Signed and Sealed this

Twenty-sixth Day of August 1986

[SEAL]

Attest:

DONALD J. QUIGG

Attesting Officer

Commissioner of Patents and Trademarks